Feb. 1, 1966
J. W. LOHR
3,232,976
SULFUR TRIOXIDE SULFATION AND SULFONATION
Filed June 4, 1964
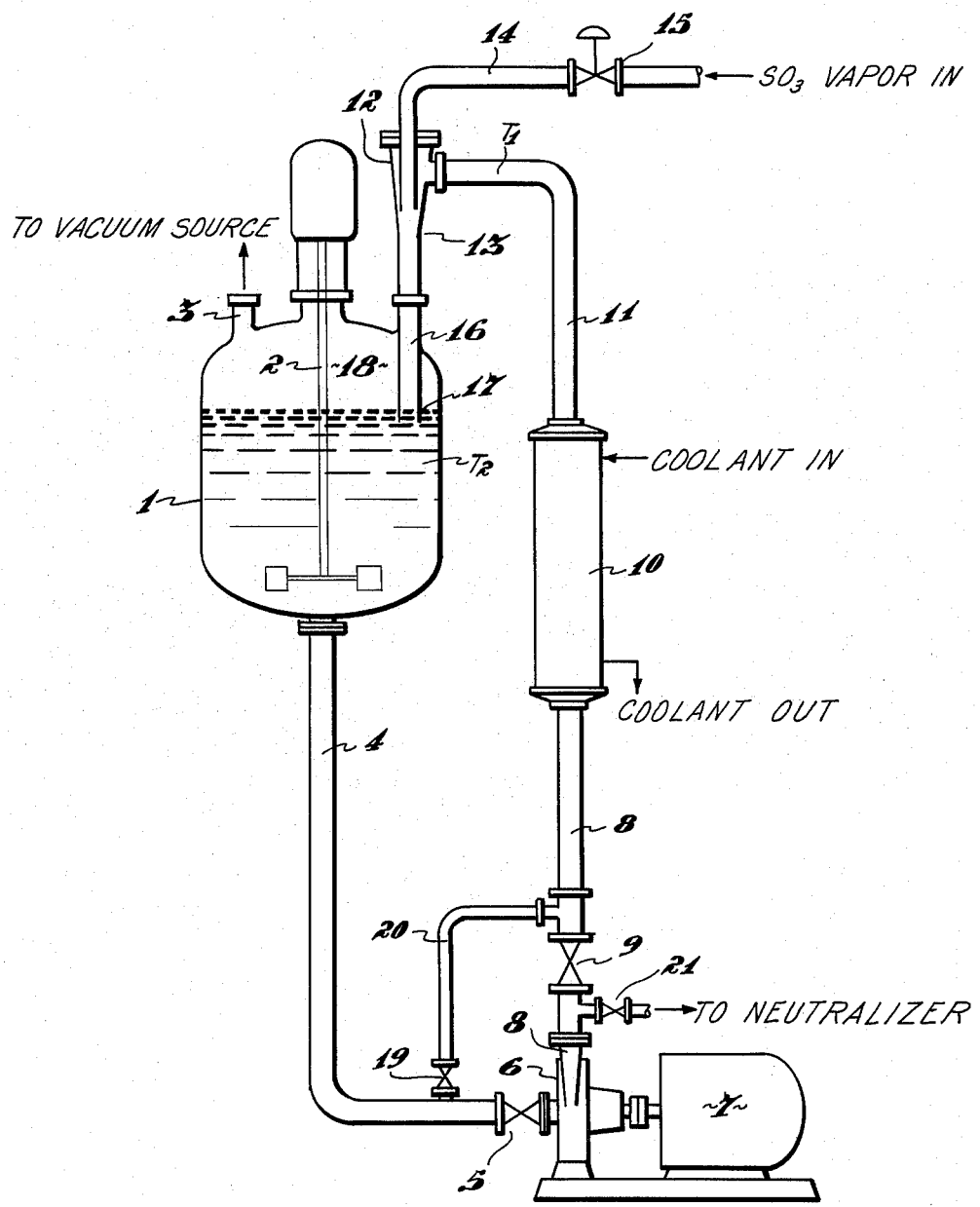
INVENTOR.
John W. Lohr
BY
Wood, Herron & Evans
ATTORNEYS 3,232,976
SULFUR TRIOXIDE SULFATION AND SULFONATION
John W. Lohr, Cincinnati, Ohio, assignor to The Andrew Jergens Company, Cincinnati, Ohio, a corporation of Ohio
Filed June 4, 1964, Ser. No. 372,590
12 Claims. (Cl. 260—459)

This application is a continuation-in-part of my copending application Serial No. 159,042, filed December 13, 1961, now abandoned.

This invention relates to sulfation and sulfonation processes. More specifically, the process relates to the sulfur trioxide sulfation of long chain and branched chain aliphatic alcohols such as fatty alcohols, and to the sulfonation of the aromatic nucleus of alkyl aromatic compounds.

The reaction of sulfur trioxide, $SO_3$, with organic compounds is known, as for example the sulfation of alcohols with sulfur trioxide whereby a sulfated alcohol is obtained. Another known reaction of sulfur trioxide is with an alkyl benzene whereby the sulfonated alkyl benzene is obtained. Such reactions are quite rapid and are accompanied by the evolution of heat; usually these reactions are so highly exothermic that the heat evolution may cause charring (i.e., discoloration and product impurities).

In conventional vapor phase processes for the sulfur trioxide sulfation of organic compounds, for example in the sulfation of lauryl alcohol, sulfur trioxide is vaporized and is brought into contact with the alcohol in the presence of a gaseous diluent such as air, nitrogen or an inert hydrocarbon. It has been thought necessary to utilize such diluent carrier gases to reduce the intensity of the reaction between the sulfur trioxide and the material being sulfated and thereby suppress unwanted side reactions. The purpose of admixing the sulfur trioxide vapor with a diluent gas is to reduce the partial pressure of the sulfur trioxide, so that the chance of a single molecule of the material being sulfated or sulfonated contacting several molecules of sulfur trioxide is reduced. Heretofore, in the absence of a gas diluent, the rate and intensity of reaction has been found to be excessive, with the result that undesirable side reactions tended to occur to a degree which impaired the quality of the sulfated or sulfonated product.

A serious disadvantage inherent in conventional sulfation and sulfonation techniques using gaseous diluents is that substantial portions, e.g. as high as three to five percent, of the liquid products which are formed become entrained in the diluent gas stream and are lost or at least become uneconomical to recover. Moreover, the conventional technique requires the use of relatively expensive gas handling equipment and/or equipment for separating entrained reactant materials from the air or gas stream.

A more serious objection to the conventional techniques has been that while undesirable side reactions are reduced by use of the diluent, they are not eliminated to the extent which might be desired, at least not without using extreme measures which defeat the economy of the vapor phase $SO_3$ method of sulfation or sulfonation. The precise nature of all of these side reactions is not known, but in general it may be said that secondary reaction products include water, which even in relatively small or trace quantities makes the sulfated product unstable, and various degradation products which impart an undesirable color, odor or other undesirable physical properties to it. Such secondary reaction products are recognized as being detrimental to the purity of the sulfated product and substantially impair its commercial value. The same undesirable physical properties may be imparted to sulfonated product as well, except that product stability under reaction conditions is not nearly so sensitive to the presence of water.

I have discovered an improved process for the sulfation and sulfonation of liquid organic compounds with sulfur trioxide whereby the several disadvantages attending the past processes are obviated or substantially eliminated.

In accordance with the process I have discovered, the reaction is conducted substantially under vacuum conditions, and the sulfur trioxide is introduced in undiluted gaseous state and at sub-atmospheric pressure into the material to be sulfated or sulfonated. No gaseous diluent is employed. The reaction is conducted at a relatively low temperature, and the $SO_3$ reagent is added to and thoroughly mixed with the organic material at a low addition rate, preferably to a recycled stream for progressive reaction.

Surprisingly, I have found that when the sulfur trioxide is thus reacted with the material to be sulfated or sulfonated under vacuum conditions and without admixed diluent gas, undesirable side reactions are greatly reduced or substantially eliminated, and product yields are significantly improved. Better control over the reaction is afforded in this manner, and therefore a more uniform product nearly free of undesirable reaction products can be obtained.

Maintenance of a reduced pressure or near vacuum condition in the reaction zone increases the intermolecular spacing of the $SO_3$, thereby decreasing the probability of contact of more than one $SO_3$ molecule with a single molecule of the material being sulfated or sulfonated. I prefer that the pressure in the reaction zone be about 15 mm. or less, for best results. The reduced pressure prevents or minimizes charring or undesirable secondary reactions which result in discolorations or in formation of other undesirable contaminants. In any event, I have observed that the quality of the reaction is improved, and in fact yield will usually be better than the yield obtained in known processes by reason of the elimination of losses of product through entrainment in the conventional diluent gas stream. Moreover, in contrast to known $SO_2$–$SO_3$ liquid phase techniques and chlorsulfonic acid techniques, it is unnecessary to separate any diluent at the completion of the reaction.

The process may best be further described by reference to the accompanying drawing which illustrates the practice of this process on a batch basis. It should be noted in this connection, however, that the specific apparatus which is illustrated in the diagram is shown only for purposes of explanation and is not intended to constitute a limitation on the practice of the process.

The organic compound which is to be sulfated or sulfonated is charged to a tank 1 which is equipped with a turbine mixer or other suitable mixing device 2 and which is connected to a source of vacuum through a conduit 3. A fluid recycle line 4 extends from the sump of the tank 1 through a valve 5 to the inlet of a fluid pump 6 which is operated by a motor 7. The pump discharge line 8 is connected through a valve 9 to a conventional cooler 10, which may be water cooled. The discharge end of the cooler 10 is connected through a fluid conduit 11 to a venturi or other turbulent flow mixing device 12.

The liquid material being reacted enters the annular cavity formed by the convergent section of the venturi device 12 and the axially disposed gas conduit 14 and is forced to flow axially in a continuous stream through the constriction thus formed. The liquid stream is thereby accelerated in velocity to a condition of turbulence upon entry into a contacting zone 13 which begins at the termination of the gas conduit 14. Flow is so directed that all surfaces in the contacting zone are wetted by the circulating liquid.

Sulfur trioxide vapors from a heated boiler not shown are admitted at a regulated rate and pressure through the control valve 15 and gas conduit 14 into the contacting zone 13. Therein said vapors intimately contact the circulating liquid and react with it.

Since contacting zone 13 is connected to conduit 16 which extends to a point within the tank 1 at or slightly below the level 17 of the liquid charge therein, all reaction products are returned to the reservoir from whence the liquid reactant was drawn. In the tank 1 reactant and reaction products are mixed and the mixture subjected to additional passages through the contacting zone 13 progressively as provided by continuous recycle.

In accordance with a preferred method of sulfating lauryl alcohol on a batch basis using apparatus of the type shown in the drawing, the tank 1 is first charged with the material to be sulfated and the system is sealed to the atmosphere. The region 18 in the tank 1 above the level 17 of the alcohol charge is evacuated through line 3. The tank should be maintained at a temperature such that the liquid reactant will be fluid or flowable and can be circulated by the pump 6, but the temperature should not be so high as to cause decomposition or degradation of any of the reactant materials or products. Where lauryl alcohol comprises the charge which is being sulfated, the temperature of the liquid should be above roughly 80° F., below which commercial lauryl alcohol tends to separate a solid crystalline fraction, and should preferably be below 110 to 120° F., temperatures above which tend to promote dehydration reactions leading to formation of undesirable reaction products. With certain other materials such as higher molecular weight alcohols, melting point considerations may make it necessary to start the reaction at higher temperatures, but subsequently progressive formation of the sulfate reduces the melting point of the mixture below that of the starting material so that it is then possible and preferable to use a lower reaction temperature.

When the system has been evacuated, the agitator or mixer 2 is started to assure uniform mixing of the contents of the tank during the sulfating operation. Next, pump blocking valves 5 and 9 are opened and pump 6 is started to circulate or recycle the contents of the tank from line 4 through the cooler 10 to the venturi 12 and back to the tank. As soon as circulation has been established, sulfur trioxide vapor from the boiler not shown is admitted to the venturi 12 through valve 15 and line 14 at a controlled rate. Preferably the rate at which the sulfur trioxide vapor is admitted to the venturi wherein it is mixed with the material being sulfated is such that the heat evolved as the $SO_3$ combines with the alcohol does not cause the temperature of the reacting mass between points $T_1$ and $T_2$ across the venturi to rise more than about 10 to 15° F. or to a temperature above about 120° F. Coolant is run through the heat exchanger 10 to remove the excess heat of reaction.

As the reactant alcohol is circulated by the pump 6 through the venturi 12, it comes into contact with the sulfur trioxide vapor which is admitted through line 14 and reacts extremely rapidly with it, in accordance with the following typical reaction: $ROH + SO_3 \rightarrow ROSO_3—H$, where R is an alkyl group having 8 or 10 to 18 carbon atoms for example. The rate of reaction of the available sulfur trioxide with the excess of alcohol present is so rapid that the reaction is substantially complete even before the liquid stream is returned to tank 1 from line 16.

It is important to note that whatever specific type of reaction apparatus is used to conduct the process, the reactants should be brought together very rapidly with the liquid being sulfated or sulfonated in preferably large excess, with relation to the quantity of sulfur trioxide introduced. Furthermore, the partially reacted material must be removed equally rapid from the contacting zone and be replaced by fresh material to be sulfated at a rate sufficient to maintain the desired excess of material to be sulfated or sulfonated in the reaction zone and to keep the maximum temperature of the reactant mass from rising to the point where oxidation or other secondary reactions would occur to an undesirable degree. I prefer to keep the temperature from exceeding 120° F. It will be apparent from the drawing that the apparatus shown provides these conditions, since the unreacted material and $SO_3$ are contacted and mixed very rapidly in the venturi, and the reacted material is rapidly removed from the region in the venturi in which free $SO_3$ is present. In addition, the reaction mass consisting of the unreacted excess material and the sulfated or sulfonated product, provided in sufficient quantity, acts as a heat sink to take up the heat released as the $SO_3$ reacts, preventing excessively high temperatures in the reaction zone.

The rate at which the sulfur trioxide is added to the liquid stream passing through the venturi 12 is preferably such that the molar quantity of reactant initially passing in unit time through the venturi 12 is about 30 to 50 times the molar rate at which the $SO_3$ is admitted to the venturi through line 14, as controlled by valve 15. Lower or higher ratios can be employed without departing from the spirit of the invention, but lower ratios will tend to give darker colored end products, while higher ratios impair process economics without corresponding improvement in the quality of the product.

With specific reference to the sulfation of lauryl alcohol, by way of example, as the sulfated product is formed, the stoichiometric excess of alcohol which was initially present begins to diminish in tank 1, and therefore in the venturi, while the quantity of sulfate, which is admixed with the alcohol, increases as recycling of the unreacted alcohol is continued. Because the reaction occurs very rapidly, no significant quantity of sulfur trioxide is lost through the vacuum line 3. Moreover, since no diluent gas is present, there is no loss of the liquid reactant or product by entrainment in a gas stream.

The unreacted alcohol and reaction products are recirculated until a substantially or nearly stoichiometric quantity of sulfur trioxide has been added to the alcohol through the venturi. As the molar rate at which the remaining quantity of alcohol passes through the venturi becomes more nearly equal to the rate at which the sulfur trioxide is being added to it, there is an increased tendency for side reactions to occur, and for that reason it is usually desirable, though not mandatory, to terminate the process when about 90 to 95% of the initial alcohol charge has been sulfated. Even at a reaction completeness of 95%, however, an excess of unsulfated material will pass through the mixing chamber for each mol of $SO_3$ introduced. At this time coolant flow is stopped, the sulfur trioxide control valve 15 is closed, and the vacuum to the system is broken. Blocking valve 9 is closed, by-pass valve 19 to a drain line 20, which by-passes the pump 6 between lines 4 and 8, is opened, and the sulfated material together with any residual quantity of unreacted alcohol is removed to a conventional neutralizing operation through a valve 21. The sulfated material may be neutralized in accordance with conventional techniques with any of the alkali metals, alkaline earth metals, alkanolamines or amines to form the respective salts of alkyl sulfuric acid. These techniques are well known to those skilled in this art and need not be described in detail herein.

From the foregoing it will be seen that the design of the reaction apparatus is not particularly critical, although the reaction must be conducted in vacuo. A venturi mixer of conventional design may be used, although it is imperative that the liquid stream does not impinge, particularly by splashing, on any internal surfaces of the mixing chamber not normally wetted and flushed by the full stream flow.

The following are three specific examples illustrating the practice of this process using equipment of the type shown in the drawing on a batch basis.

Example 1

Ninety-six pounds (0.48 mol) of commercial lauryl alcohol (hydroxyl value 280, molecular weight 200) were charged into a glass lined jacketed tank fitted with an agitator. The tank was connected to an external circulating pump for circulating the reacting alcohol through a venturi mixing device back into the tank. The free space in the system was evacuated of air to an absolute pressure of 6 mm. A sealed flask in a heating mantle was charged with a supply of Sulfan, which is a commercially available stabilized sulfur trioxide. This flask was connected through a throttling valve to the venturi mixing device. When the system had reached full vacuum, vaporization of sulfur trioxide was begun and over a period of about 2½ hours, 38.6 pounds of sulfur trioxide (0.48 mol) were vaporized and mixed with the recirculated mass in the venturi mixer. On neutralization of the reaction mass in a mixture of 39¼ pounds of monoisopropanolamine and 280 pounds of water, there was obtained a total of 451.85 pounds of a monoisopropanolamine lauryl sulfate solution having a total of 7.87% organically combined $SO_3$ equivalent to 35.6 pounds of sulfur trioxide and 8.7 pounds (1.93%) of monoisopropanolamine sulfate, formation of this compound being attributable to moisture pick-up of approximately 0.7 pound resulting from incomplete drying of the system following washing.

Example 2

By the method of Example 1, 94 pounds of commercial lauryl alcohol (0.47 mol) were reacted with 38.7 pounds (.483 mol) of sulfur trioxide. The neutralized product contained 8.27% of organically combined $SO_3$ equivalent to 37.4 pounds of sulfur trioxide and 2.34 pounds of monoisopropanolamine sulfate (.52%) in 451.6 pounds of neutralized lauryl sulfate solution.

Example 3

As in the method of Example 1, 94 pounds of commercial lauryl alcohol (.47 mol) were reacted with 37.2 pounds (.465 mol) of sulfur trioxide. The neutralized product contained 8.1% of organically combined sulfate equivalent to 36.5 pounds of sulfur trioxide and 2.17 pounds of monoisopropanolamine sulfate (0.49%) in 450.5 pounds of neutralized lauryl sulfate solution.

The preceding examples illustrate the practice of this invention in the process of sulfation. The following examples illustrate its application to the process of sulfonation.

Example 4

In order to illustrate the sulfonation of alkyl aromatic compounds by the process I have invented, a commerically available straight chain alkyl benzene having an average molecular weight of 243 was sulfonated with $SO_3$. Though principally $C_{12}$, this material is a mixture of alkyl benzenes having straight chain alkyl groups containing 11–15 carbon atoms. On each alkyl chain is substituted a single phenyl group, all position isomers from 2 through 6 being present in the mixture. A two thousand pound charge (8.23 mols) of this linear alkyl benzene mixture was contacted with 660 pounds (8.25 mols) sulfur trioxide in apparatus of the type described and by the batch method above described. Initially the alkyl benzenes were present in large excess, and as the reaction progressed the overall $SO_3$/alkyl benzene mol ratio approached 1.002. The reaction was conducted at an absolute pressure between 4.8 mm. and 7.0 mm. of mercury and at a venturi throat or nozzle temperature between about 90 and 115° F. during the course of the reaction.

The absorption of sulfur trioxide was substantially quantitative. Total loss of sulfur trioxide through the vacuum system was less than 0.6 pound, i.e., less than 0.1% of the total charged. In the sulfonating reaction, —$SO_3H$ groups attach to the aromatic nuclei primarily at the para position but to lesser extents at the ortho and meta positions.

A portion of the resultant alkyl benzene sulfonic acid mixture was neutralized with sodium hydroxide, yielding a clear, light yellow, viscous, nearly odorless liquid having excellent lathering and foaming properties in water. The neutralizer charge and product analysis were as follows:

| Neutralizer Charge | Parts | Mols AB | Mols $SO_3$ | Mols NaOH |
| --- | --- | --- | --- | --- |
| Alkyl Benzene Sulfonic Acid Mix | 274 | 0.848 | 0.850 | |
| 50.05% NaOH | 69 | | | 0.863 |
| Water | 584 | | | |
| | 927 | | | |

| Product | NaABS | AB | $NaSO_4$ | $H_2O$ |
| --- | --- | --- | --- | --- |
| By Neut. Equiv. Calculated: | | | | |
| Mols | 0.837 | 0.011 | 0.013 | |
| Percent | 31.2 | .29 | 0.2 | 68.31 |
| By Lab. Anal. Found, percent | 31.8 | 0.51 | | 68.37 |

The reaction was 98% complete on the basis of alkyl benzene charge, and the reaction product contained more than 98.5% sulfonic acid.

Example 5

The unneutralized balance of the alkyl benzene sulfonic acid mixture produced according to Example 4 was further reacted with $SO_3$ by the same method, at an absolute pressure of 17 mm. and at a temperature of 110° F. until the final ratio of reactant sulfur trioxide to alkyl benzene was 1.06:1.0. A portion of this further reacted material was neutralized to form the sodium salt, and yielded a cloudy, light yellow, viscous, nearly odorless liquid having excellent lathering and foaming properties in water. The product became clear on standing several days at room temperature (77° F.). Neutralizer charge and resultant product analysis were as follows:

| Neutralizer Charge | Parts | Mols AB | Mols $SO_3$ | Mols NaOH |
| --- | --- | --- | --- | --- |
| Alkyl Benzene Sulfonic Acid Mix | 2,660 | 8.12 | 8.69 | |
| 50.05% NaOH | 719 | | | 9.00 |
| Water | 5,621 | | | |
| | 9,000 | | | |

| Product | NaABS | AB | $Na_2SO_4$ | $H_2O$ | Disulfonate Na |
| --- | --- | --- | --- | --- | --- |
| Calculated by Neut. Equiv.: | | | | | |
| Mols | 7.86 | | 0.31 | | 0.26 |
| Percent | 30.2 | | .49 | 68.18 | 1.29 |
| Found by Lab. Analysis, percent | [1] 31.5 | 0.3 | 0.49 | 67.43 | |

[1] Includes disulfonated material—reacting monofunctionally with analytical reagent used.

The reaction was calculated to be 98.7% complete, and the product contained more than 99% alkyl benzene sulfonic acid.

The following organic compounds are representative of the types of organic compounds which may be reacted according to the process I have described, to give substantially the same results: among the alcohols, $C_8$ to $C_{18}$ straight chain and branched chain primary or secondary alcohols, including octyl, decyl, myristyl, cetyl, and stearyl alcohols and mixtures thereof, oxoalcohols including decanol, tridecanol and hexadecanol alcohols derived from the hydration of unsaturated petroleum fractions, and ethoxylated derivatives of these compounds. Among the alkyl aromatics, alkyl benzenes having 11 to 15 carbon atoms in the alkyl group, straight chain or branched chain, may be sulfonated by this process. In general the process is suitable for the sulfation or sulfonation of organic materials amenable to the reaction conditions imposed by sulfur trioxide vapor in the absence of a gaseous diluent. The range of reactable organic materials is limited only by the requirement that the materials must be sufficiently fluid to be circulated through the contacting device within a temperature range which is compatible with the properties of the end product desired. It is also contemplated that the reactant organic material could be suspended or dissolved in an inert liquid medium in order to enable the reaction to be effected at a temperature at which the products are stable.

Although this invention has been described primarily in relation to a batch processing technique, continuous processing techniques may be used by providing for continuous regulated introduction of $SO_3$ and the materials to be sulfated or sulfonated and for continuous withdrawal of product as formed at the same rate. In a continuous process the stoichiometric ratio of $SO_3$ to the organic reactant should not exceed approximately unity.

Having described my invention what I claim is:

1. The method of reacting sulfur trioxide with a material selected from the class consisting of aliphatic alcohols having about 8–18 carbon atoms per molecule, ethoxy derivatives thereof and alkyl benzenes having about 11–15 carbon atoms in the alkyl group which comprises, pumping said material in the liquid state under pressure into a contacting zone as a continuous turbulent stream of high velocity, contacting sulfur trioxide vapor undiluted with any gaseous diluent with said continuous stream as said stream enters said contacting zone, the pressure of the sulfur trioxide vapor where it comes into contact with said stream being subatmospheric, the molar rate of flow of said material into said contacting zone substantially exceeding the molar rate of flow of sulfur trioxide into said zone, and rapidly withdrawing the reaction products from the contacting zone.

2. The method of claim 1 wherein the reaction products are recirculated together with said material through said nozzle and are contacted in the contacting zone with additional sulfur trioxide vapor.

3. The method of claim 1 wherein the absolute pressure of said sulfur trioxide vapor in said contacting zone is less than about 15 mm.

4. The method of claim 1 wherein said stream continuously wets the surfaces defining said contacting zone.

5. The method of claim 1 wherein heat released by the reaction of said sulfur trioxide vapor with said material is removed at a rate sufficient to prevent the temperature in said contacting zone from exceeding about 120° F.

6. The method of claim 1 wherein the temperature increase across said contacting zone is not more than about 15° F.

7. The method of claim 1 wherein said material is an aliphatic alcohol having about 8–18 carbon atoms per molecule.

8. The method of claim 1 wherein said material is an alkyl benzene.

9. The method of reacting sulfur trioxide with an aliphatic alcohol having about 8–18 carbon atoms per molecule which comprises, heating said alcohol to 80–120° F. and pumping it under pressure into a contacting zone as a continuous turbulent stream of high velocity, contacting sulfur trioxide vapor undiluted with any gaseous diluent with said continuous stream as said stream enters said contacting zone, the pressure of the sulfur trioxide vapor where it comes into contact with said stream being subatmospheric, the molar rate of flow of said alcohol into said contacting zone substantially exceeding the molar rate of flow of sulfur trioxide into said zone, rapidly withdrawing the reaction products from the contacting zone, and removing heat released as said sulfur trioxide vapor reacts with said alcohol at a rate sufficient to prevent the temperature from rising more than about 15° F. across said contacting zone and from exceeding about 120° F. in said contacting zone.

10. The method of reacting sulfur trioxide with a material selected from the class consisting of aliphatic alcohols having about 8–18 carbon atoms per molecule, ethoxy derivatives thereof and alkyl benzenes having about 11–15 carbon atoms in the alkyl group which comprises, pumping said material in the liquid state under pressure into a contacting zone as a continuous turbulent stream of high velocity, contacting sulfur trioxide vapor undiluted with any gaseous diluent with said continuous stream as said stream enters said contacting zone, the pressure of the sulfur trioxide vapor where it comes into contact with said stream being subatmospheric, said material being circulated through said contacting zone at an initial rate which is equal to about 30–50 times the molar rate at which said sulfur trioxide vapor flows into said zone, rapidly withdrawing the reaction products from the contactng zone, and recirculating said material and reaction products through said contacting zone, the molar rate at which said material is recirculated diminishing as reaction products accumulate in mixture with said material but said rate always being in excess of unity.

11. A method of reacting sulfur trioxide with an alkyl benzene having about 11–15 carbon atoms in the alkyl group, said method comprising, pumping said alkyl benzene in the liquid state under pressure into a contacting zone as a continuous turbulent stream of high velocity, contacting sulfur trioxide vapor undiluted with any gaseous diluent with said continuous stream as said stream enters said contacting zone, the pressure of the sulfur trioxide vapor where it comes into contact with said stream being subatmospheric, said sulfur trioxide vapor being contacted with said material at a mol ratio which does not exceed unity, rapidly withdrawing the reaction products from the contacting zone, and preventing the temperature in said contacting zone from exceeding about 120° F.

12. In the reaction of sulfur trioxide with an organic material of the class consisting of aliphatic alcohols having about 8–18 carbon atoms per molecule, ethoxy derivatives thereof and alkyl benzenes having about 11–15 carbon atoms in the alkyl group, the improvement which comprises, pumping said organic material in the liquid state into a reaction zone as an annular continuous turbulent liquid stream of high velocity, admitting sulfur trioxide vapor unadmixed with any diluent through the center of said annular stream into contact with said stream, said sulfur trioxide vapor being at a pressure which is subatmospheric and being absorbed into and reacting with the said organic material in said stream, rapidly removing the reactants from the reaction zone, and maintaining the rate of flow of organic material into said zone in substantial stoichiometric excess of the rate of flow of said sulfur trioxide vapor into said zone.

References Cited by the Examiner

UNITED STATES PATENTS

| | | | |
|---|---|---|---|
| 2,634,287 | 4/1953 | Fincke | 260—459 |
| 2,828,331 | 3/1958 | Marisic et al. | 260—686 X |
| 2,863,912 | 12/1958 | Smith | 260—686 X |
| 2,865,958 | 12/1958 | Davies et al. | 260—686 X |
| 2,945,842 | 7/1960 | Eichhorn et al. | 260—686 X |

CHARLES B. PARKER, *Primary Examiner.*

JOSEPH P. BRUST, *Examiner.*